United States Patent
Narayanaswami et al.

(10) Patent No.: US 8,065,235 B2
(45) Date of Patent: Nov. 22, 2011

(54) PORTABLE INTELLIGENT SHOPPING DEVICE

(75) Inventors: Chandrasekhar Narayanaswami, Wilton, CT (US); Mandayam Thondanur Raghunath, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 1448 days.

(21) Appl. No.: 10/429,372

(22) Filed: May 5, 2003

(65) Prior Publication Data

US 2004/0225613 A1     Nov. 11, 2004

(51) Int. Cl.
*G06Q 20/00*     (2006.01)
(52) U.S. Cl. ............... 705/64; 705/26.82; 705/27.1
(58) Field of Classification Search .......... 705/64
See application file for complete search history.

(56) References Cited

U.S. PATENT DOCUMENTS

| | | | | |
|---|---|---|---|---|
| 5,789,732 | A * | 8/1998 | McMahon et al. | 235/487 |
| 5,939,699 | A * | 8/1999 | Perttunen et al. | 235/462.01 |
| 6,525,997 | B1 | 2/2003 | Narayanaswami et al. | |
| 6,915,272 | B1 * | 7/2005 | Zilliacus et al. | 705/26 |
| 7,107,247 | B2 * | 9/2006 | Kinoshita et al. | 705/64 |
| 2001/0051903 | A1 * | 12/2001 | Hansmann et al. | 705/26 |
| 2001/0052545 | A1 * | 12/2001 | Serebrennikov | 235/462.46 |
| 2002/0178088 | A1 * | 11/2002 | Lurie et al. | 705/26 |
| 2003/0058261 | A1 * | 3/2003 | Challa et al. | 345/690 |

OTHER PUBLICATIONS

IBM's Linux Watch: The Challenge of Miniaturization. Narayanaswami et al. Computer [online], vol. 35, No. 1, pp. 33-41, Jan. 2002. [Retrieved on Sep. 21, 2009]. Retrieved from the Internet: <http://ieeexplore.ieee.org/stamp/stamp.jsp?arnumber=00976917>.*
Chandra Narayanaswami, M.T. Raghunath, "Application design for a smart watch with a high resolution display," Jun. 2000, Yorktown Heights, New York.

* cited by examiner

*Primary Examiner* — Jamie Kucab
(74) *Attorney, Agent, or Firm* — Michael J. Buchenhorner; Vazken Alexanian

(57) ABSTRACT

A portable intelligent shopping device which can be worn as a wristwatch or carried on a belt. It makes paying for purchases more secure. The device stores the wearer's private key and digital certificate. It can also store the public keys of various stores. When the wearer (shopper) buys something from a store, the store can request a payment of the appropriate amount from the wearer's watch. The authorization for payment of the amount specified by the request for payment may be transmitted using IR or RF. The watch can then display the amount and request the shopper to confirm the transaction by entering a PIN number by tapping on the touch screen or using the roller wheel. Once the correct PIN is entered, the watch can send a message to the store authorizing payment of the requested amount. The store can verify the message based on the shopper's encrypted certificate by decrypting it using the shopper's public key. The entire payment authorization signal can be encrypted by the shopper using the store's public key so that only the store can decrypt it with its private key.

9 Claims, 8 Drawing Sheets

PORTABLE INTELLIGENT SHOPPING DEVICE

CROSS-REFERENCE TO RELATED APPLICATIONS

Not applicable.

FEDERALLY SPONSORED RESEARCH OR DEVELOPMENT

Not Applicable

INCORPORATION BY REFERENCE OF MATERIAL SUBMITTED ON A COMPACT DISC

Not Applicable.

FIELD OF THE INVENTION

The invention disclosed broadly relates to the field of computer systems, and more particularly relates to the field of wearable personal computing devices.

BACKGROUND OF THE INVENTION

In today's busy world, shoppers look to technology for ways to make the shopping experience easier, faster and more secure. Stores look to technology to lower the high cost of sales transactions which is directly attributable to the increasingly high cost of hiring and paying employees. Therefore, there is a need for greater automation of the purchase and sales transaction process. Credit cards and debit cards are now the methods of payment favored by many shoppers over cash because of the convenience and also because many shoppers are hesitant to carry large amounts of cash. As today's commerce moves toward a paper-less transactional paradigm, the traditional shopping list hand-written on a sheet of paper has evolved into a list digitally stored in a handheld computer. These conveniences have improved the shopping experience to a certain level, but many inconveniences remain in the shopping experience. Since most of the buying public cannot afford a personal shopper there are still many drawbacks inherent in the shopping experience which need to be addressed.

One such drawback is the necessity of carrying and handling methods of payment, such as credit cards. Consider a shopper on a shopping excursion during a busy holiday weekend and assume that this shopper intends to pay for purchases with department store credit cards. Every purchase made by the shopper involves removing the credit card from a wallet after first removing the wallet from a purse or trouser pocket. Then, after the transaction is finalized with the credit card, requiring the shopper's signature, the shopper needs to replace the card back in the wallet. Consider a shopper performing this ritual several times over the course of a shopping expedition, each time loaded down with more and more bags of purchases. The potential for misplacing the credit cards or the purchases increases with each transaction. In addition, this same shopper has to be constantly vigilant that no one will steal the purchases, the credit cards, or even the shopper's wallet or purse.

Credit card purchases also generate paper in the form of receipts. The shopper has to properly store the receipts, which are easy to misplace. Many shoppers do not want to carry receipts because of the fear that someone could appropriate the receipt and copy a signature or credit card number from the receipt. This is why many gasoline station payment systems do not print a receipt unless the customer asks for one.

Finding the desired items in a crowded store can be a considerable chore. Assume that the shopper is looking for clothing items and assume also that this shopper is constrained by a budget, as are most shoppers. The shopper needs to first find the desired apparel in the correct size and then check the price of the item. This is not easily accomplished in a crowded store where a shopper needs to check tags on items hanging very close together on racks. Sometimes a shopper has to remove dozens of items from clothing racks in order to find and read the size and price tags in search of the desired garment.

The increasing popularity of purchasing items online has created a need for security measures. One of these is public key encryption. This technology makes it possible for persons purchasing items from an internet site to provide their credit information in a secure manner by using encryption. The technology also provides means for the store to make sure that authorizations for payment are received from the person who purports to send it. There also exists technology for determining whether anyone has tampered with a digital payment authorization message.

There is therefore a need for a device which can overcome the preceding drawbacks and shortcomings in the prior art while preserving secure purchase communications.

DEFINITION OF TERMS

Some key terms are defined here. The definitions listed here are from the *Computer Desktop Encyclopedia*, Copyright© 1981-2001, The Computer Language Company, Inc.

Barcode—The printed code used for recognition by a bar code scanner (reader). Traditional one-dimensional bar codes use the bar's width to encode just a product or account number. Two-dimensional bar codes, such as PDF417, MaxiCode and DataMatrix, are scanned horizontally and vertically and hold considerably more data. PDF417 is widely used for general purposes. MaxiCode is used for high=speed sortation, and DataMatrix is used for marking small parts.

Bar code scanner—A device specialized for reading bar codes and converting them into either the ASCII or EBCDIC digital character code. In order to be read, the tip of the pen must physically touch the bar code. Later, laser scanners allowed the bar code to be read at a slight distance from the head of the device, enabling supermarkets to read round cans and flexible packages more easily. The most common of that type today is the visible laser diode (VLD) scanner, which emits as many as 50 laser beams simultaneously to capture the image at any angle.

Certificate—a certificate contains the public key for the person or entity to which the certificate is issued. The certificate is signed by a trusted party such as VeriSign. The signature helps in making a trusted association between the entity and the public key.

Digital Signature—A digital signature, or e-signature, is a sequence of bytes that is appended to an electronic document that can be used to verify the identity of the person signing the document, and also that the document has not been modified since it was signed.

Liquid Crystal Display (LCD)—A display technology that uses rod-shaped molecules (liquid crystals) that flow like liquid and bend light. Un-energized, the crystals direct light through two polarizing filters, allowing a natural background color to show. When energized, they redirect the light to be absorbed in one of the polarizers, causing the dark appearance of crossed polarizers to show. The more the molecules are twisted, the better the contrast and viewing angle. Because it takes less power to move molecules than to energize a light-emitting device, LCDs replaced LEDs in digital watches years ago.

LED—(Light Emitting Diode) A display technology that uses a semiconductor diode that emits light when charged. It usually gives off a red glow, although other colors can be generated. It is used in readouts and on/off lights in a myriad of electronic appliances. It was the first digital watch display, but was superseded by LCD, which uses less power. LEDs are also used as a light source for fiber-optic transmission. They are typically used with lower-bandwidth multimode fibers.

PDF417 (Portable Data File417). A two-dimensional bar code that was created in the late 1980s, the standard was later placed in the public domain and is governed by the Automatic Identification Manufacturers (AIM) trade association. The PDF417 can hold up to 1,800 bytes of any digital data in a printed area about the size of a business card.

Point of sale terminals: Capturing data at the time and place of sale. Point of sale systems use personal computers or specialized terminals that are combined with cash registers, bar code readers, optical scanners and magnetic stripe readers for accurately and instantly capturing the transaction. Point of sale systems may be online to a central computer for credit checking and inventory updating, or they may be stand-alone machines that store the daily transactions until they can be delivered or transmitted to the main computer for processing.

Private key is defined as: The private part of a two-part, public key cryptography system. The private key is kept secret and never transmitted over a network.

Public key is defined as: The published part of a two-part, public key cryptography system. The private part is known only to the owner.

Public key cryptography: A cryptographic method that uses a two-part key (code) that is made up of public and private components. To encrypt messages, the published public keys of the recipients are used. To decrypt the messages, the recipients use their unpublished private keys known only to them.

SKU—(StockKeeping Unit) The number of one specific product available for sale.

SUMMARY OF THE INVENTION

Briefly, according to a claimed invention, a mobile information processing device for purchasing items from a store comprises: a memory for storing information comprising a private key and certificate for a user of the device; a receiver for receiving a request for payment authorization message from a sales terminal in the store; logic for processing the request for payment authorization message received from the sales terminal, the price signal comprising a price for a selected item; logic for presenting the price to the user; a user interface device for enabling acceptance by the user of the price responsive to the entry of a personal identification number for the user; logic for generating a price authorization message for transmission to the sales terminal wherein the price authorization message includes an e-signature of the user; encryption engines for protecting communication from eavesdroppers; and logic for transmitting the price authorization message to the sales terminal.

According to another embodiment of the claimed invention, a method for purchasing an item of interest comprises steps of: receiving a first signal from a sales terminal in a store, the first signal comprising a request for payment of a price for an item and an identification of the item; presenting the price to a user; presenting a prompt to the user facilitating acceptance of the price; receiving an indication from the user upon acceptance of the price; and encrypting a confirmation signal using a public key of the store, the confirmation signal confirming a purchase and comprising an electronic signature of the user; and sending the confirmation signal to the sales terminal to confirm the purchase.

In another embodiment, a method for purchasing a selected item from a store, comprises: receiving a request for payment authorization from a sales terminal of the store, the request for payment authorization comprising at least one selected item and a price for each selected item; presenting the price to a shopper; presenting a prompt to the shopper for acceptance of the price; receiving an indication from the shopper of the acceptance of the price; and encrypting a payment authorization signal using a public key of the store, the payment authorization signal confirming a purchase and comprising an encrypted version of a certificate of the shopper; sending the payment authorization signal to the sales terminal to confirm the purchase.

In another embodiment, a method of selling items in a store comprises steps of receiving, from a mobile device, a signal comprising information including a list of items of interest and transmitting a signal indicating the location of items of interest in the store to the mobile device.

In another embodiment, a method of selling items in a shopping mall comprises the steps of: receiving a signal from the mobile device, wherein the signal comprises information including a list of items of interest. In response to receiving the signal the method transmits a signal indicating the price and location of items of interest in the store to the mobile device.

DESCRIPTION OF THE PREFERRED EMBODIMENTS

According to a preferred embodiment, a small, lightweight, wearable intelligent device of varying form factors assists shoppers in selecting and purchasing desired items. This assistance is in the form of a secure and automated performance of paper-less purchase and sale transactions.

Figure 1:
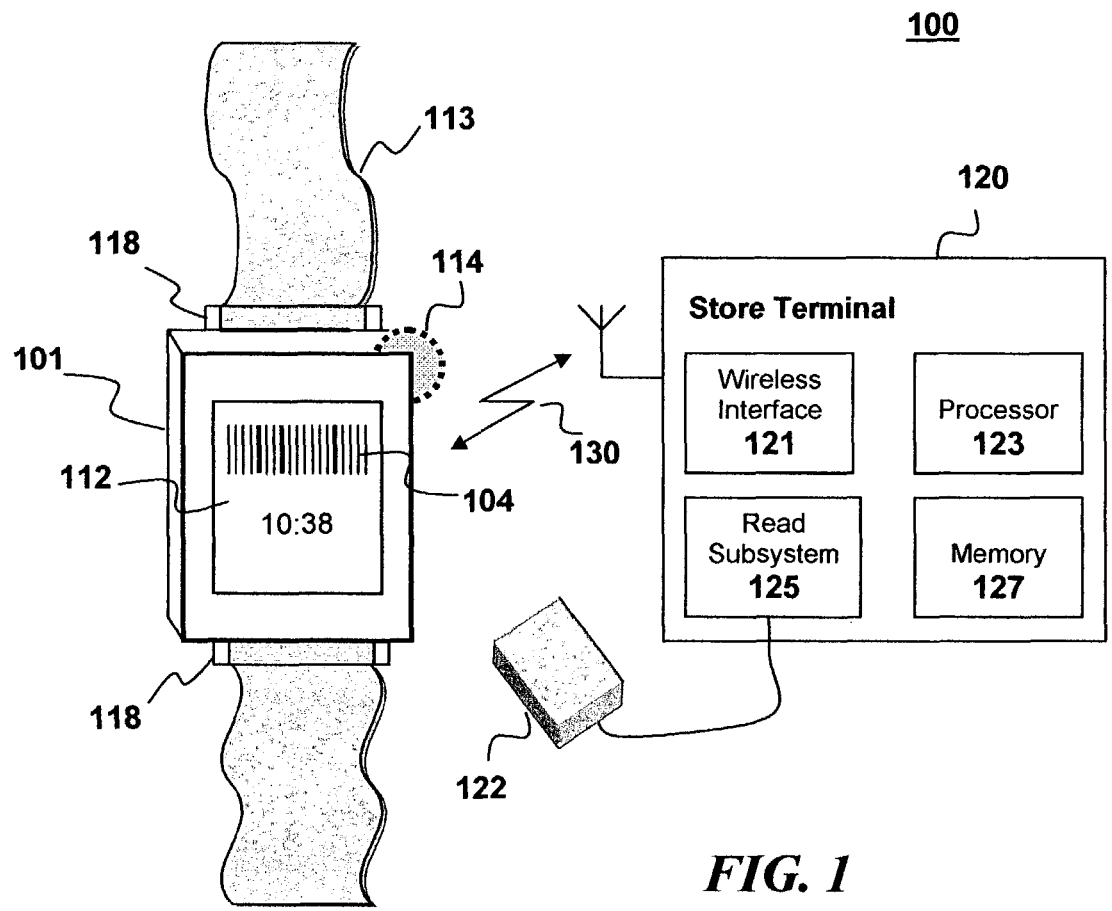
FIG. 1 is an illustration of a sales transaction system according to an embodiment of the invention.
Figure 1A:
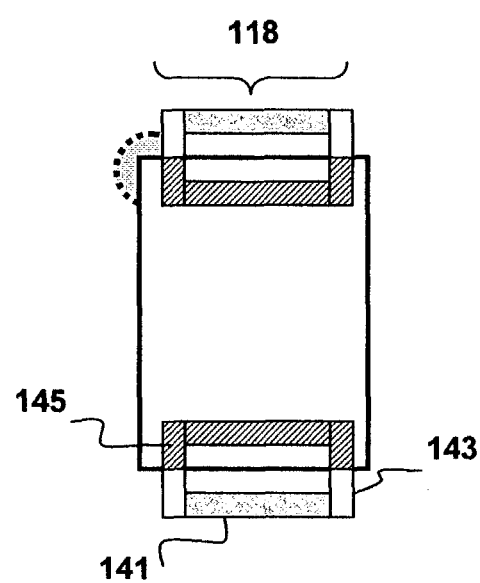
FIG. 1A is a view of the back of a portable intelligent shopping device, according to an embodiment of the invention.

Referring to FIG. 1, an automatic and secure purchase and sale transaction system 100 according to an embodiment of the invention comprises a Portable Shopping Device 101 and a Store Terminal 120 that communicate with each other to perform a paper-less transaction.

The Portable Shopping Device (PSD) 101 is an information processing system that is preferably a small lightweight device suitable to be worn on a shopper's wrist or carried in a shirt pocket or attached to a belt or lanyard. In the example shown in FIG. 1, the PSD 101 uses a wrist watch form factor for convenient mobility. It preferably comprises a high definition display 112, preferably with a touch-sensitive screen, and a scrolling wheel input device 114, as described in commonly-owned U.S. Pat. No. 6,525,997 B1 "EFFICIENT USE OF DISPLAY REAL-ESTATE IN A WRIST WATCH DISPLAY" and "Application Design for a Smart Watch with a High Resolution Display" by Chandra Narayanaswami and M. T. Raghunath, both of which are incorporated by reference as if fully set forth herein. The display screen 112 is shown displaying the time and a bar code 104. The bar code 104 represents purchase item information according to one embodiment of the invention. On the top and bottom of the watch casing are shown retractable bars 118 through which a watch strap 113 is threaded.

The second component of the sales transaction system 100 is the Store Terminal 120 which is a point of sale terminal, similar to those found in any major department store but adapted to operate according to embodiments of the invention. The Store Terminal 120 in this embodiment comprises a wireless interface 121, a processor 123, a read subsystem 125 and memory 127. Connected to the read subsystem 125 is a bar code reader 122 (also known as a bar code scanner) for reading the bar code 104 on the PSD 101. The double-headed arrow 130 represents signals, such as short-range Radio Frequency (RF) or Infra-Red (IR) signals, for transmitting data to enable a wireless purchase transaction.

The compact size and lightness of the PSD 101 make it ideal to be worn as a wristwatch. Other form factors are also contemplated within the spirit of the invention, such as a belt accessory, but for purposes of this example we will focus our discussion on the wristwatch form factor.

Figure 2:
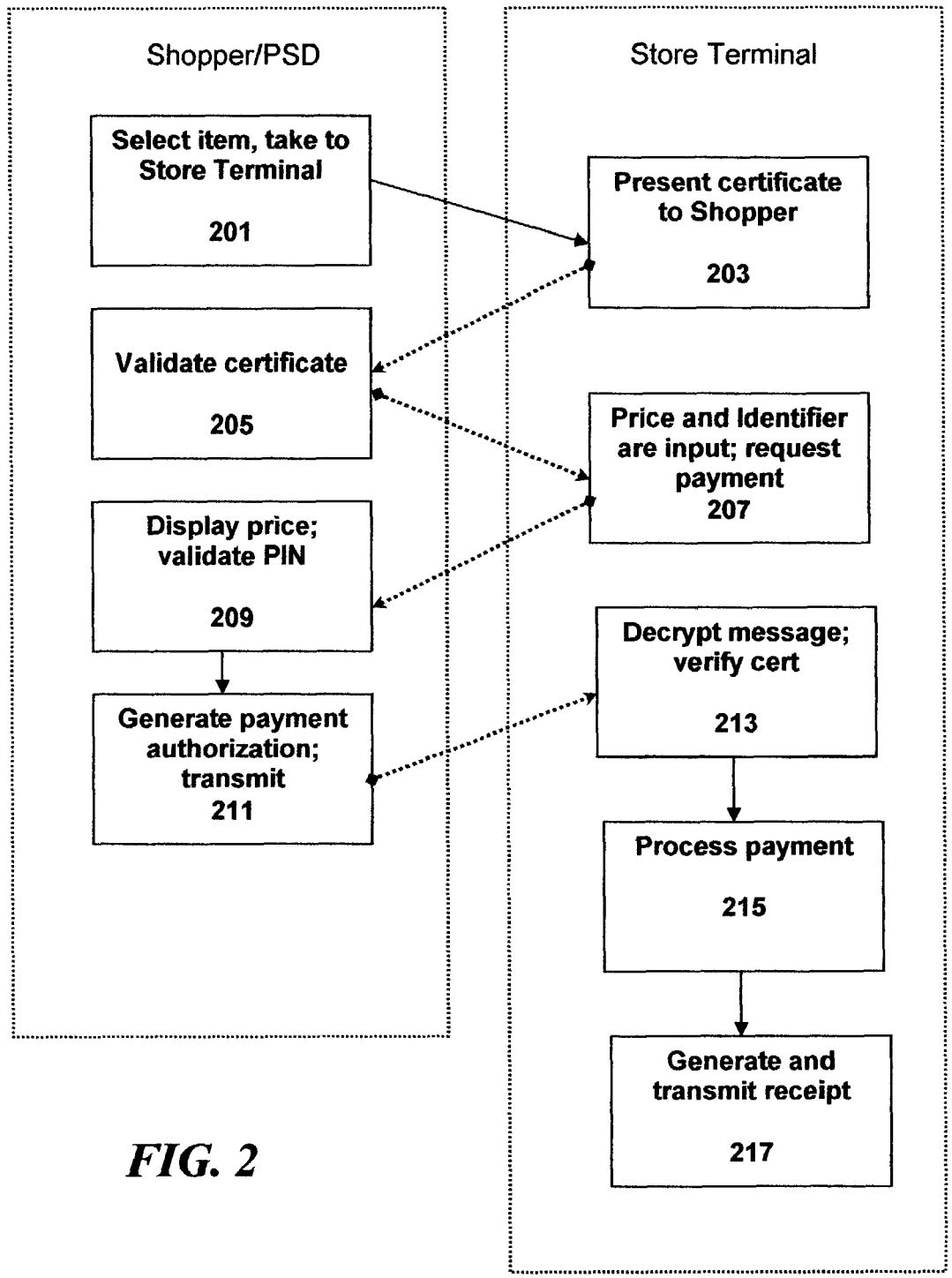
FIG. 2 is a data flow diagram of a purchase and sale transaction, according to an embodiment of the invention.

FIG. 2 illustrates the operation of the sales transaction system 100 with respect to a purchase and sale transaction in a department store. The actions performed by the PSD 101 are shown on the left and the actions performed by the Store Terminal 120 are shown on the right. The sales transaction system 100 operates as follows. In step 201 a user, wearing the PSD 101, selects an item for purchase and brings the item to the Store Terminal 120. A method according to an embodiment of the invention for selecting an item for purchase is discussed below with reference to FIG. 7. The PSD 101 will communicate to the Store Terminal 120, preferably via wireless transmission, that it requires the store's certificate in order to commence a transaction.

In step 203, the Store Terminal 120, in response to a transmission from the PSD 101, presents the store's certificate to the user. For purposes of the discussions to follow we will refer to the user of the PSD 101 as a shopper. This transmission from the Store Terminal 120 can also be done via an encrypted wireless transmission protocol. In step 205 the PSD 101 checks the certificate to verify that it originated from a valid Store Terminal 120. The certificate is issued by a trusted third party service organization, such as VeriSign. The PSD 101 uses VeriSign's public key to verify VeriSign's signature on the certificate.

The PSD 101 may already have the store's public key stored in its memory 127 or may receive it at this time. The Store Terminal 120 may have already sent the store's public key to the PSD 101 in step 203.

In step 207, the price of the item for purchase and its identifying information, such as the SKU, are input to the Store Terminal 120 through conventional means, perhaps by a sales clerk scanning the price tag. The Store Terminal 120, after receiving the item identifier and amount, transmits a request for payment authorization of the selected item by providing a signal to the PSD 101 preferably via an appropriate communication medium, such as IR or RF transmission. The signal comprises a price for the item and an identification of the item by known means such as a displayed written description. This request for payment is preferably encrypted by the Store Terminal 120 with the store's private key and the shopper's public key. This encryption is essential to assure the shopper that the request for payment, which will include a request for form of payment, such as a credit card number, originates from the Store Terminal 120 and not someone trying to steal a credit card number.

Next, in step 209, the PSD 101 presents the received information to the shopper, in response to receiving the request for payment authorization from the Store Terminal 120. Since this message requesting payment from the Store Terminal 120 is encrypted, the PSD 101 will decrypt the message using the shopper's private key and the enclosed certificate is decrypted with the store's public key. This message, which contains the price of the item, can be presented to the shopper in the form of a text message on the display 112 or perhaps in the form of an audio message.

At this time, the shopper can also be prompted to enter his or her personal identification code (e.g., a number or PIN) in order to validate the request for payment. This is a security feature to prevent someone who has stolen the PSD 101 from using it to make unauthorized purchases.

The PSD 101 will confirm the PIN entered, and if it is valid, in step 211 the PSD 101 generates a message authorizing payment, including an account number or credit/debit card number, for the selected item, which needs to be encrypted for security purposes. The PSD 101 then appends an e-signature to the message that includes an amount and the card or account number. The message also preferably includes an interjacence counter-measure, such as a hash function performed on the message to generate a message digest. The signed payment authorization is encrypted using a suitable encryption scheme to protect the communication from eavesdroppers. Such an encryption scheme can be implemented by programming the PSD 101 with an algorithm stored in memory 127 for execution by the processor 123, or by an application-specific integrated circuit comprising the appropriate algorithms.

In step 213 the Store Terminal verifies the shopper's e-signature in the payment authorization and accepts the e-signature in lieu of a paper signature. Since the message included a form of payment, such as a credit card number, the next step 215 involves the Store Terminal 120 processing the purchase using conventional means, such as contacting the credit card agency and transmitting the purchase price to be credited to the shopper's credit card.

If the store does not have a device that can communicate with the PSD 101 using IR or RF signals the method works as follows. The store clerk orally tells the shopper the amount due. The shopper enters the payment amount into the watch along with his/her PIN. Once this is done, the PSD 101 creates a payment authorization message that includes the payment authorization amount and credit card or store account information. The PSD 101 then signs the message as discussed above. It then encodes a payment message and shopper's certificate, preferably as a 2-dimensional bar code 104 for display on the PSD 101 display screen 112. The store can scan the bar code 104 clearly displayed on the display screen 112 of the PSD 101 with a bar code reader 122 and verify it as above. Since the device has a very high resolution display, for example 600 dots per inch (600 dpi), it can be used to convey a large amount of information on a screen using a 2D barcode. The amount of information which can be stored on a 2D barcode is more than a hundred bytes.

If the store does not have a 2D bar code reader, the watch can be used to send the same message using a sequence of one-dimensional (1D) bar codes. Most stores have 1D barcode readers which can be easily retrofitted to read a bar code displayed on a shopper's PSD 101.

In step 217 a receipt for the purchase and sale transaction is generated by the Store Terminal 120. This receipt can be generated through conventional means, such as a paper receipt, or, as an optional alternative to a paper receipt, the Store Terminal 120 could generate an electronic receipt. This electronic receipt could be encrypted by the store with the shopper's public key and transmitted to the PSD 101. The PSD 101 would then decrypt it with its private key and store it. This is an optional alternative to receiving a paper receipt.

The display 112 has several modes, which can be selected by using the roller wheel 114 or other input device, such as the touch screen, as more fully described in commonly-owned U.S. Pat. No. 6,525,997 B1 "EFFICIENT USE OF DISPLAY REAL ESTATE IN A WRIST WATCH DISPLAY" and also in the publication "Application Design for a Smart Watch with a High Resolution Display" by Chandra Narayanaswami and M. T. Raghunath. In bar code mode, the display 112 shows the bar code of the selected/purchased item, and optionally displays the current time. When in bar code mode, the shopper presents the PSD 101 display screen 112 to a sales clerk in order for the sales clerk to scan the bar code 104 using a bar code reader 122. Optionally, the information can be scanned by the shopper.

In price mode, the display 112 shows the price of the selected item, but in place of the current time, the user sees an accept/reject icon. A user of the PSD 101 can accept a price by any of several ways such as tapping or clicking on an accept command displayed on the screen 112.

In the above-discussed example the shopper uses credit card information to authorize payment but it should be understood that other means of payment authorization can also be used. For example, the shopper could use digital tokens that are analogous to physical tokens that can be purchased for later payment for items of interest.

Figure 3:
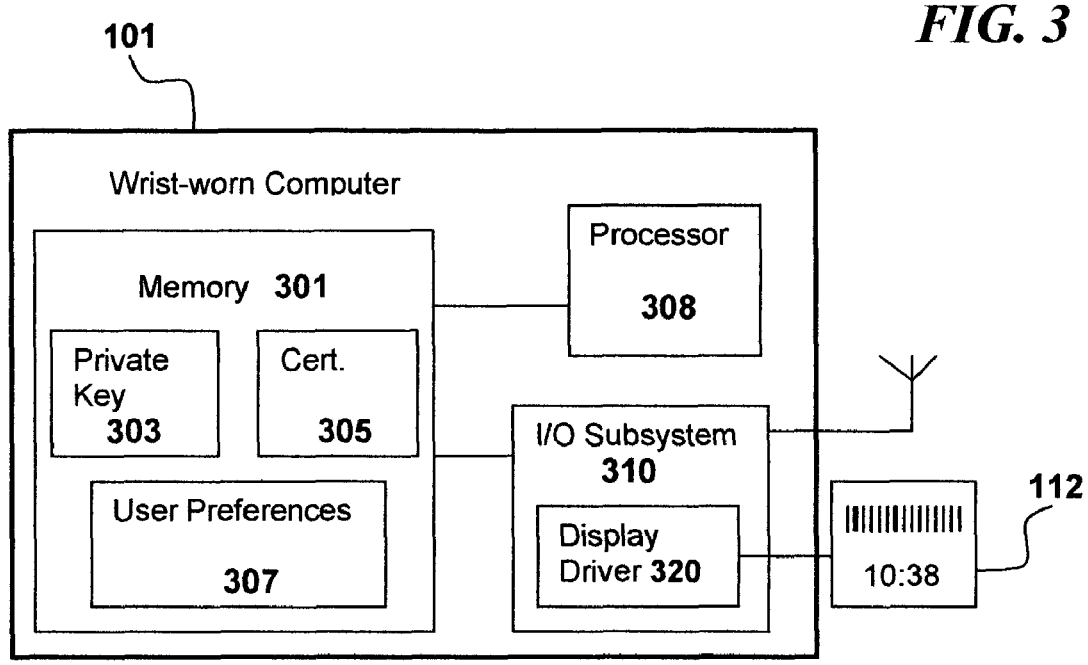
FIG. 3 is a block diagram of a portable intelligent shopping device, according to an embodiment of the invention.

Referring to FIG. 3 we show a block diagram of the portable shopping device 101 showing a highly simplified version of the key internal components. The memory block 301 stores a private key 303, a certificate 305 and user preferences 307. The memory 301 is connected to a system processor 308 and an Input/Output subsystem 310. The I/O subsystem, containing a display driver 320, is in turn connected to the user interface which is the display 112 and to an antenna for transmission of signals to store terminals. The display 112 is shown displaying a bar code and the time. The memory 301 can be a semiconductor memory such as a flash EPROM (erasable, programmable, read-only memory), a small hard disk drive, or any other suitable information storage device. The logic performed according to the invention can be realized with either an application-specific integrated circuit (ASIC) or a general-purpose processor and instructions embedded in Read Only Memory (ROM) or other storage for performance by the processor.

Figure 4:
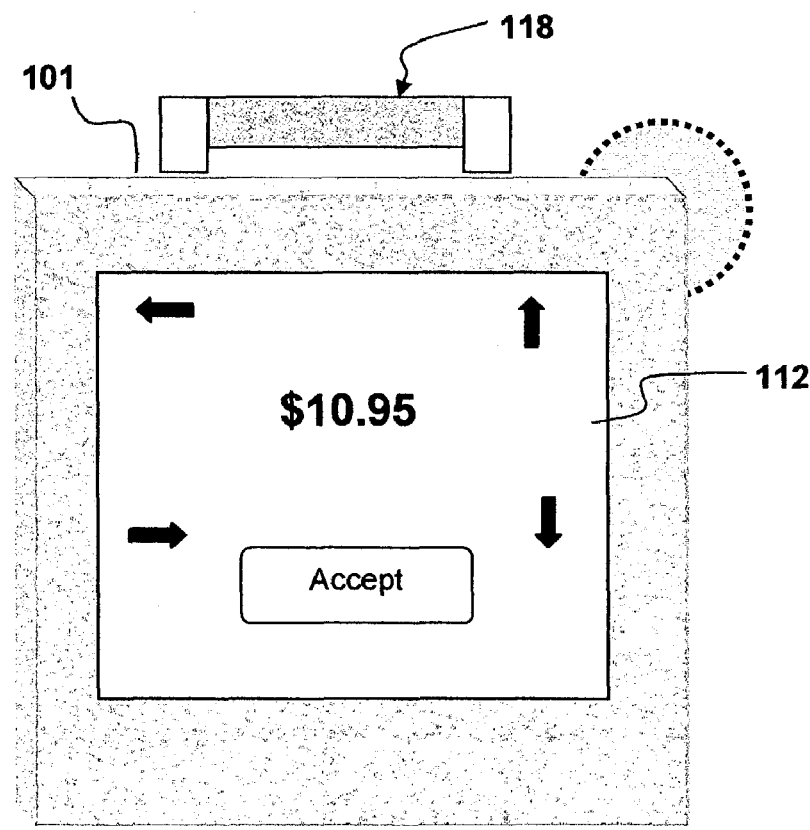
FIG. 4 is an illustration of the top view of a portable intelligent shopping device displaying a price, according to an embodiment of the invention.

FIG. 4 shows a close-up top view of the PSD 101 with the display in "price" mode. The display 112 shows the price of the item selected for purchase. At the bottom of the display window there is a button 401 for accepting or declining the purchase. The arrow icons around the display screen represent directions for scrolling the content displayed on the screen and for toggling back and forth among display modes, such as price mode (displaying an item price) and bar code mode (displaying purchase item information for scanning). It should be understood that other icons can also be used to represent functions and functions other than scrolling and toggling are possible within the spirit and scope of the invention, as described in "Application Design for a Smart Watch with a High Resolution Display" by Chandra Narayanaswami and M. T. Raghunath.

Figure 5:
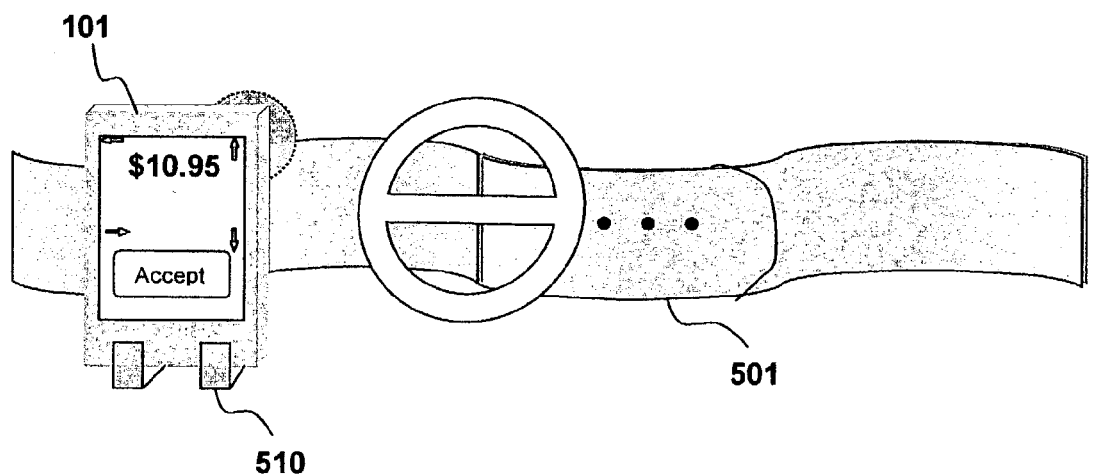
FIG. 5 is an illustration of the portable intelligent shopping device worn on a belt, according to an embodiment of the invention.

FIG. 5 shows another embodiment wherein the PSD 101 is attached by a belt clip 510 and worn on a belt 501. This embodiment is more convenient for PSD 101 models that are bigger or heavier than may be comfortably worn on a wrist.

Figure 6:
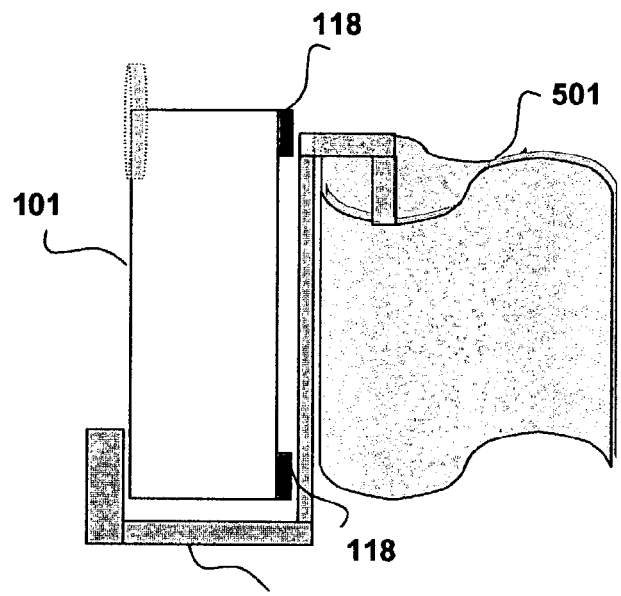
FIG. 6 is an illustration of a side view of the portable intelligent shopping device worn on a belt, according to an embodiment of the invention.

FIG. 6 is a side view of the PSD 101 disposed in the belt clip 510. As can be seen from this illustration, the PSD 101 can be easily removed from the belt clip 510 and carried by hand or in an alternative embodiment, it can be attached to a lanyard or key ring. A wrist-worn PSD 101 can be modified to be worn on a belt by retracting the watch strap bars 118 into grooves on the back casing. The grooves are represented by the cross-hatched boxes.

Figure 7:
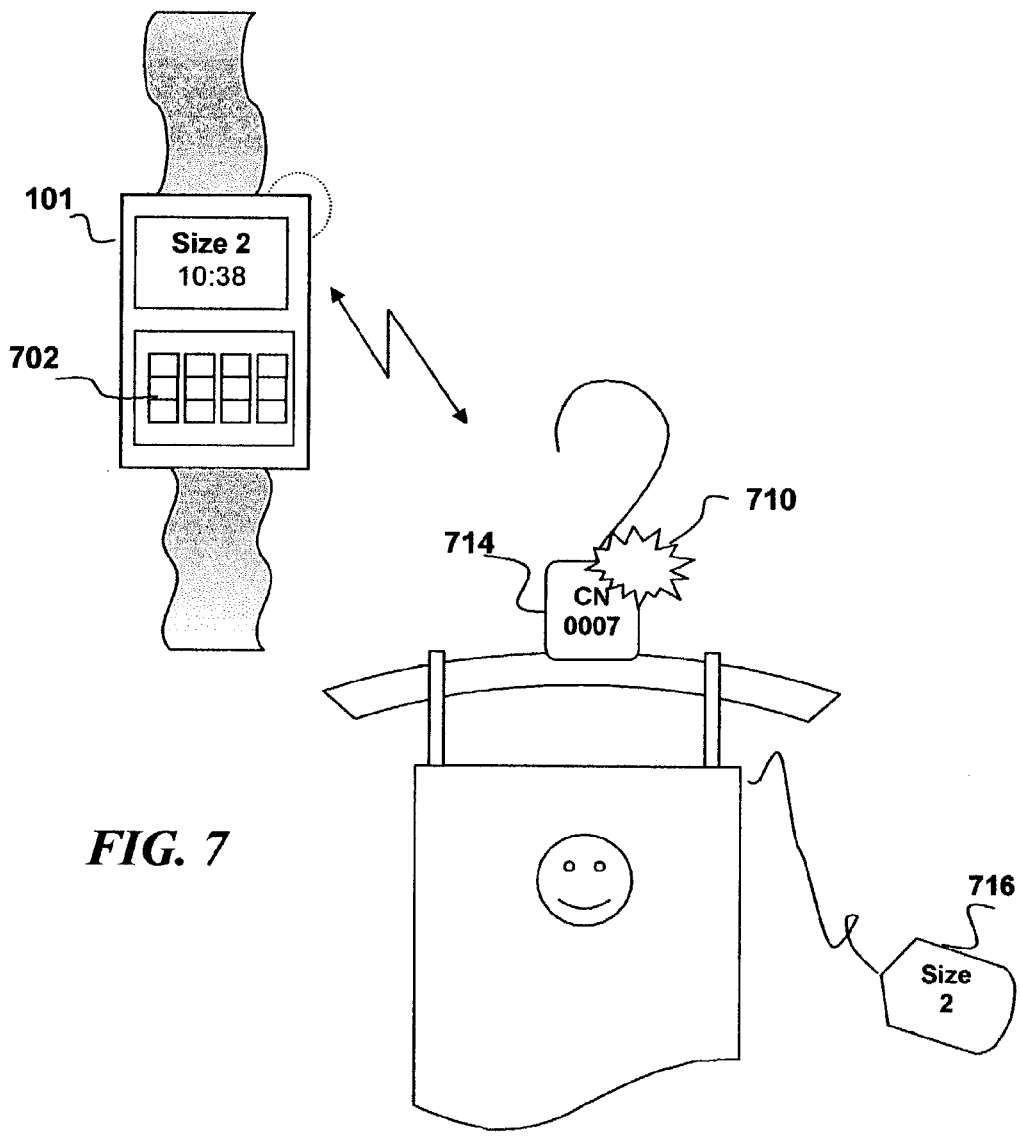
FIG. 7 is an illustration of the size selection feature of the portable shopping device, according to an embodiment of the invention.

Referring to FIG. 7, there is shown a PSD 101 with additional optional features of memory and logic for storing a shopper's size, color and/or price preferences. The PSD 101 can be configured to transmit a shopper's preferences by means of a short-range transmitter so that when a shopper wearing the PSD 101 approaches a rack of clothing all of the clothes that match the shopper's preferences light up responsive to receiving the transmission comprising the preferences. The short range transmissions can be accomplished by transmission of a periodic low power radio (or other medium) signal comprising the shopper's preferences. Once a store wireless terminal receives the signals, it identifies the matching items and causes a location indicator such as a light 710 or sound to alert the shopper of the sought item's location.

For example, in one embodiment of the invention a shopper would key in his/her size preference into the PSD 101 using a keypad 702. Assume that the shopper wishes to select clothing that is size 2. The shopper would key this information into the keypad 702. In the store, the clothes hangers on the clothes rack are equipped with small Light Emitting Diodes (LEDs) 710 located on the upper portion of the hanger where it would not be obscured by the attached garment. The PSD 101 transmits the shopper's size preference to the clothes rack by means of a periodic or constant radio signal comprising the shopper's size preferences. The signal is preferably a short-range signal so that the transmission strength of the signal is strong enough to be received by the clothes rack only when the shopper is near enough to the clothes rack to be able to see it. Alternatively, the signal could be received directly by the LEDs attached to the clothes hangers. The LEDs attached to the hangers that match that size light up with a blinking light, preferably a red blinking light. Only the hangers displaying size 2 clothing would light up, therefore the shopper would know at a glance which clothing items to inspect. The shopper would not have to pick up each item and search for a size tag.

In an alternative embodiment, the LEDs could be attached to the clothing items or a tag 716 hanging from the clothing items.

In another embodiment the LED could light up with a display 714 of a shopper's name, nickname, or code word in order to distinguish a particular shopper's desired item from that of a nearby shopper concurrently transmitting a size selection for a different size.

This principle is extensible to other concepts. Assume a grocery shopper keys in or downloads a grocery shopping list to the PSD 101. When in an aisle in a grocery store, tags light up near the items that a shopper wearing a PSD 101 has identified in his shopping list in the PSD 101. User preferences, such as the grocery shopping list, can be entered into the PSD 101 by connecting it to a docking station or connector attached to a personal computer. Only the items in the grocery list which are located in close proximity to the shopper wearing the PSD 101 would light up.

The range of distance between the PSD 101 and the item which lights up has to be pre-selected by the individual store and this selection will most probably be based on the type and size of the store. For example, in a large supermarket where a shopper can easily see most items along an entire aisle of the supermarket, the range can be set to encompass the length and breadth of the grocery aisle. In a small, crowded boutique or a small department within a department store where a shopper has a limited range of vision, the range can be set to a circle with a diameter not to exceed six feet. When the shopper is within range, the items selected by the PSD 101 will light up and then when the shopper moves out of range, the lit items turn off.

Figure 8:
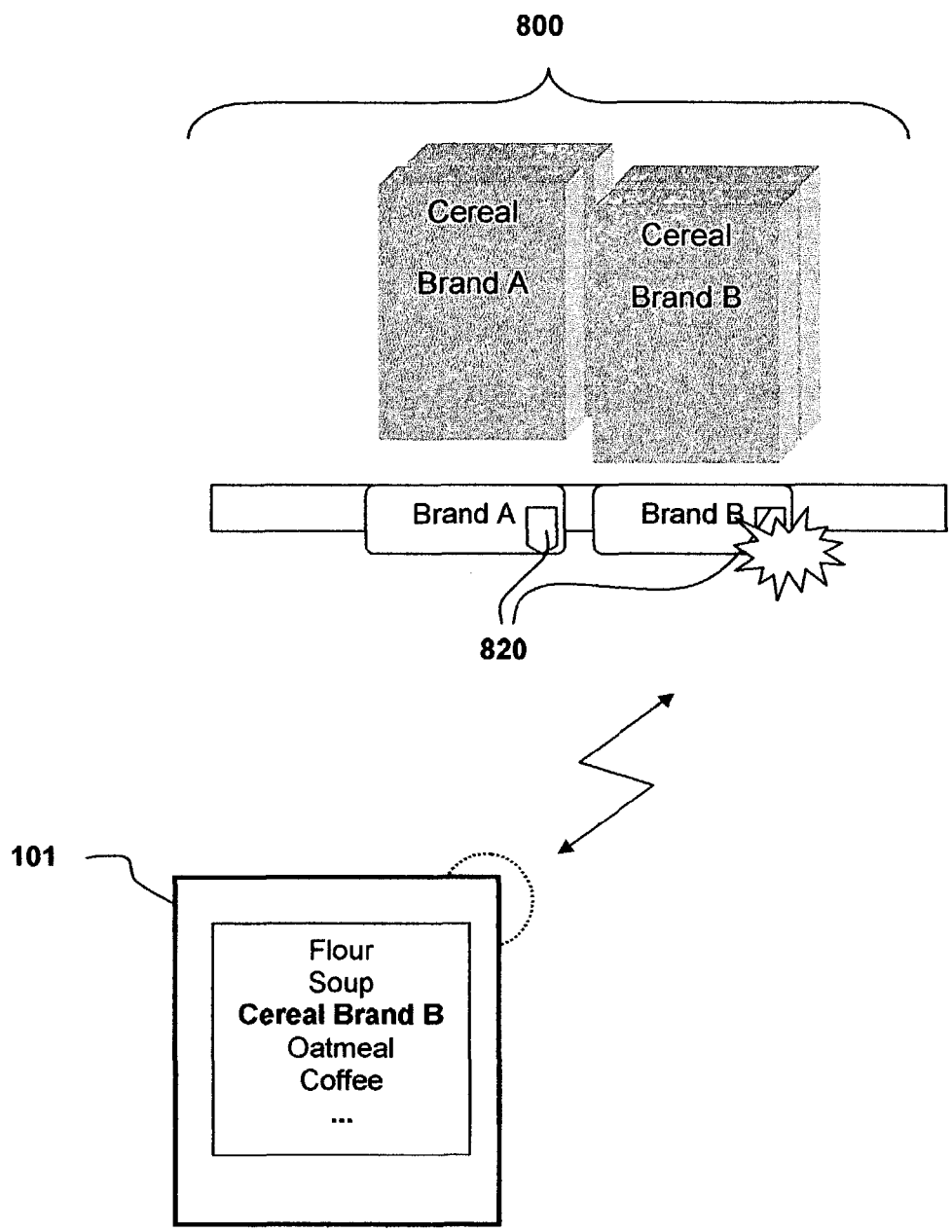
FIG. 8 is an illustration of the grocery shopping list feature of the portable shopping device, according to an embodiment of the invention.

FIG. 8 shows a PSD 101 in wristwatch form factor and a sample representation of a cereal aisle 800 in a grocery store. As shown in FIG. 8, electronic tags 820 placed near the desired items from the shopper's list will light up, perhaps with a flashing light, when the shopper is near enough to the desired items (in this case, a desired cereal brand) to be alerted by the lights. The shopping list could be downloaded from the shopper's computer or personal digital assistant (PDA).

In addition to sending a signal to flag the desired items, the PSD 101 could also download an electronic route map of the grocery store and then, using this route map, rearrange the shopping list items so that they track the aisles in the grocery store, according to the route map. For example, assuming a shopper begins grocery shopping in aisle 1 and then proceeds through the store until the last aisle, the shopping list would be rearranged so that all of the aisle 1 items are listed first, then the aisle 2 items, etc. The items would light up when the PSD 101 is in close proximity to them, aisle by aisle. The list could be recomputed dynamically if the shopper sees something not on the list and decides to go get it, thereby deviating from the set route. For example, if a shopper is in aisle 3 and instead of proceeding to aisle 4 goes directly to the produce section in the back of the store near aisle 7, the PSD 101 will rearrange, or sort, the items on the grocery list to originate with the items closest to the produce section.

Optionally, a shopper could delete or tag items on the grocery list as they are picked, similar to a shopper drawing a line through items on a paper list. This can be done by tapping on the touch screen where the item name appears, perhaps with a stylus, or by using the rotating wheel 114 as a scroller to highlight an item for deletion and then depressing the wheel 114 to select the item. Highlighting and selecting items on a wrist watch display are known to those skilled in the art and are discussed in U.S. Pat. No. 6,525,997 B1 "EFFICIENT USE OF DISPLAY REAL-ESTATE IN A WRIST WATCH DISPLAY" and "Application Design for a Smart Watch with a High Resolution Display" by Chandra Narayanaswami and M. T. Raghunath.

An additional feature would be to provide an option for ordering of the shopping list other than by the location of items, such as sorting a list beginning with non-perishable foods and ending with frozen foods. Many grocery shoppers, especially those buying a large load of groceries, prefer to get the frozen foods (designated as the most perishable) last.

In another embodiment and use of the PSD 101, mall stores broadcast their specials and the device can receive these broadcasts and alert the shopper when a desired item is on sale nearby. The shopper has no need to transmit information about what items and/or sizes the shopper desires. There is no necessity for transmits from the shopper's PSD 101. In this embodiment, the device stores an identification of at least one desired item and the mall stores broadcast their specials. If one of the broadcasted specials matches an item in the shopper's list within the PSD 101, the device alerts the shopper. The alert could be in the form of an alarm or a flashing light on the display 112 of the PSD 101. Watch alarms and flashing light displays are both known and used in wrist watch technology today.

In a shopping mall, the PSD 101 can also keep track of the best broadcasted price for an item and act as a best-price finder for a particular item. Assume the shopper is traversing a typical large suburban mall where many of the stores stock the same items. The shopper introduces the item of interest into the PSD 101 and walks through the mall. The stores are broadcasting items with their respective prices (similar to the broadcast technology used in cellular telephone communication). The PSD 101 will only store the broadcast which matches the desired item input by the shopper. Assume many of the stores in this mall are broadcasting the same item, but with different prices. The PSD 101 will store all of these broadcasts and automatically sort the list in order from lowest to highest price. A quick glance at the list informs the shopper of the best price for the desired item.

In a similar embodiment, a shopper performs reverse auctions using the PSD 101 device. For example, at a mall the PSD 101 sends out an offering bid for an item that the shopper wants to buy. All stores in the mall that are properly equipped receive the bid and respond with "yes/no/best offer" transmissions. If the shopper does not like any offer made by the merchants he or she can go buy the item elsewhere. On the other hand, if a favorable response is received from one or more merchants, the user can proceed to purchase the item or negotiate further.

Figure 9:
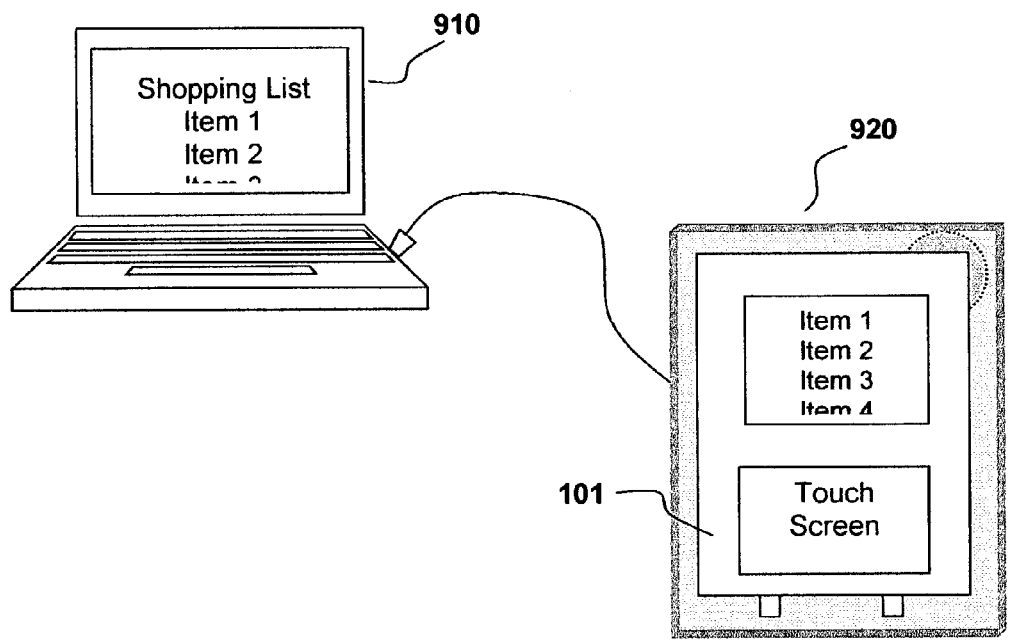
FIG. 9 is an illustration of a system wherein an embodiment of the invention can be advantageously used.

FIG. 9 shows an adapter or docking station 920 for connecting the PSD 101 to a desktop personal computer (PC) 910 for entry and synchronization of data. Thus, the user can use the PC 910 to enter the user preferences such as shopping lists and clothing sizes. Because the PSD 101 preferably maintains a record of sales transactions it has completed, a synchronization process can update the shopping list to eliminate items already purchased, and perhaps update an inventory record or check purchases against a family budget stored in the PC 910. Alternatively, a portable keyboard can be connected to the PSD 101 to make data entry easier. The adapter 920 shown in FIG. 9 enables the PSD 101 to access a greater amount of storage than it would be able to contain. In addition, the adapter 920 provides a portal to the internet. This interaction with other devices such as PCs and PDAs is a convenient way for small devices with limited storage, such as the PSD 101, to exponentially increase their utility.

Figure 10:
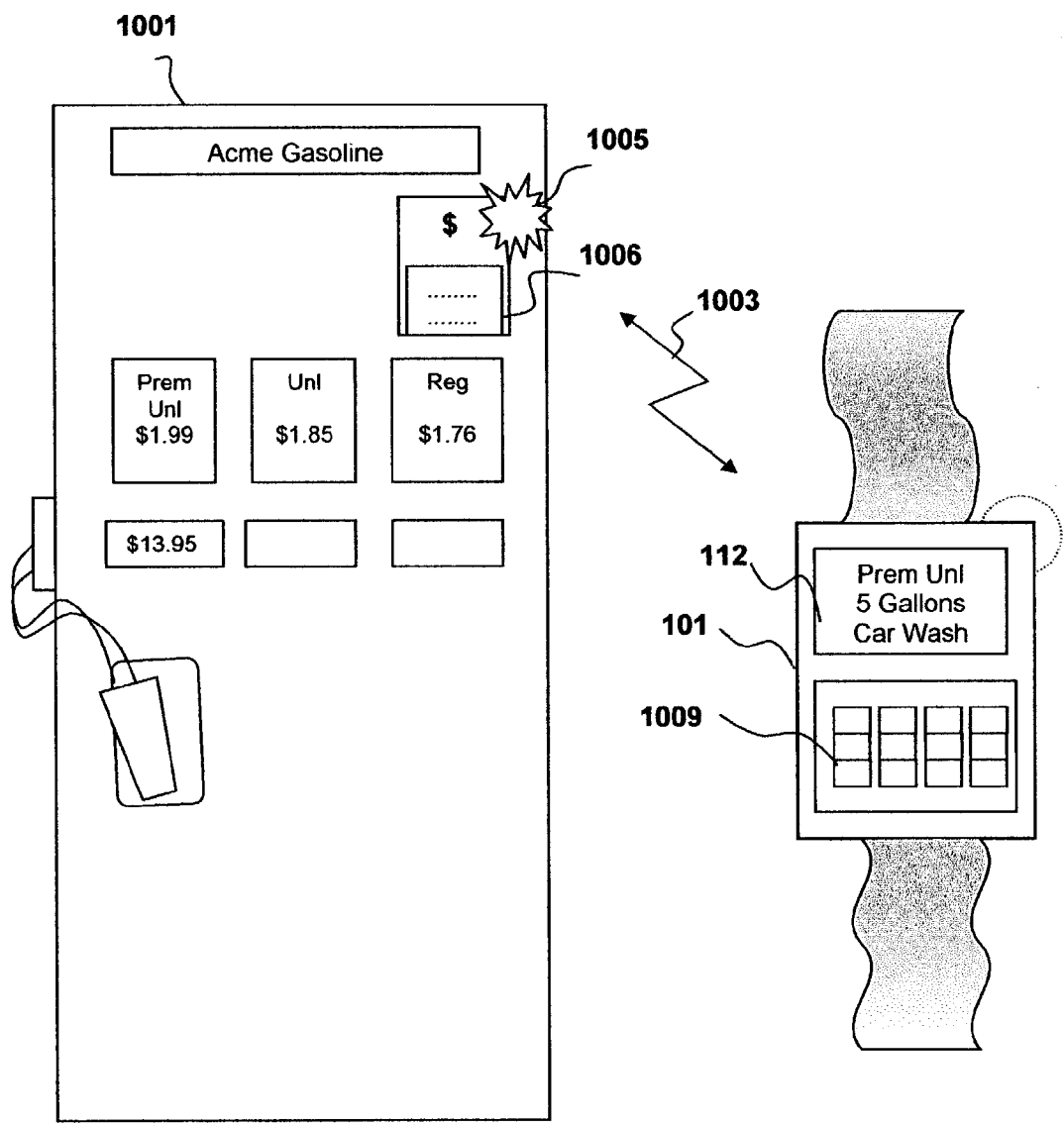
FIG. 10 is an illustration of the portable shopping device used for the purchase of gasoline at a gas station, according to an embodiment of the invention.

Referring to FIG. 10 there is shown an illustration of an embodiment according to the invention used for facilitating the purchase of gasoline at a gasoline station. Most gasoline stations have automated payment systems for paying by credit/debit card right at the gasoline kiosk. In this embodiment, the shopper selects a payment method at the kiosk that uses a system according to the invention. The kiosk preferably transmits a short range (e.g., low power) signal to the shopper, comprising the price of the grade of gasoline selected and the shopper confirms the purchase as described above. One variation in the system in this case is that the kiosk transceiver sends the PSD 101 a final confirmation of price based on the amount of gasoline actually pumped.

In this example, the PSD 101 is configured for transmitting a gasoline purchase preference via a short-range transmitter to the gasoline kiosk 1001. The diagonal arrow 1003 represents the signal which facilitates the communication between the gasoline kiosk 1001 and the PSD 101. As is shown in FIG. 10, the display 112 reflects the shopper's choice of gasoline (Premium Unleaded), number of gallons to purchase (5 gallons) and the additional choice of a car wash purchase. A shopper introduces these preferences, perhaps by using the keypad 1009, and the PSD 101 transmits a signal 1003 to an electronic receiver 1005 located on the gasoline kiosk 1001, preferably located either on or within close proximity to the gasoline sales register 1006. After receiving this purchase request, the gasoline kiosk 1001 requests a confirmation and validation, perhaps by requesting the shopper's PIN. The gasoline purchase and sale transaction is then concluded in a manner as described earlier in the discussion of FIG. 1.

The examples and illustrations discussed above are meant to represent some of the ways in which the instant invention can be advantageously used to facilitate purchase and sale transactions in a secure manner. Those skilled in the art will perceive that the examples discussed above are by no means comprehensive, but instead are a representative sampling of the possible embodiments of the instant invention.

Therefore, while there has been described what are presently considered to be the preferred embodiments, it will be understood by those skilled in the art that other modifications can be made within the spirit and scope of the invention.

We claim:

1. A mobile information processing device for purchasing a selected item from a store, the device comprising:
    a housing in a form of a wrist watch;
        a memory that stores information comprising:
            a card number reflecting a form of payment;
            a private key and certificate for a user of the device;
            a personal identification code of the user; and
            a public key of the store for verification purposes;
        a receiver configured to receive a request for a payment authorization message from a sales terminal in the store, said payment authorization message comprising a price for the selected item;
        a processor operatively coupled with the memory and configured to:
            process the request for the payment authorization message received from the sales terminal;
            generate a price authorization message for transmission to the sales terminal wherein the price authorization message comprises:
                the price of the selected item;
                the card number reflecting the form of payment;
                an e-signature of the user; and
                an interjacence countermeasure that ensures the user that the price authorization message is free from interjacence;
            transmit the price authorization message to the sales terminal;
        an antenna for transmission of signals to the store terminal;
        an input/output subsystem operatively coupled with the memory and the processor, said input/output subsystem comprising:
            a display driver; and
            a display, having several modes selectable by using a scrolling wheel, configured to:
                present the price to the user; and
                enable acceptance by the user of the price responsive to the entry of the personal identification code for the user;
        at least one encryption engine that protects communication between the device and the sales terminal; and
        the scrolling wheel configured to control the display.

2. The mobile information processing device of claim 1, further comprising a radio transceiver that transmits radio signals to the sales terminal and that receives radio signals from the sales terminal.

3. The mobile information processing device of claim 1, further comprising an infrared transceiver that transmits infrared signals to the sales terminal and receives infrared signals from the sales terminal.

4. The mobile information processing device of claim 1, wherein the encryption engine further comprises logic that encrypts the user's certificate using the user's private key.

5. The mobile information processing device of claim 1 wherein the interjacence counter-measure comprises a hash function performed on the message to generate a message digest.

6. The mobile information processing device of claim 1 further comprising an encrypted signed payment authorization for protecting the communication from eavesdroppers.

7. The mobile information processing device of claim 6 wherein the signed payment authorization is encrypted by programming the device with an algorithm stored in the memory for execution by the logic.

8. The mobile information processing device of claim 6 wherein the signed payment authorization is encrypted using an application-specific integrated circuit comprising appropriate algorithms.

9. A mobile information processing device for purchasing a selected item from a store, the device comprising:
    a housing in a form of a wrist watch;
        a memory that stores information comprising:
            a card number reflecting a form of payment;
            a private key and certificate for a user of the device;
            a personal identification code of the user; and
            a public key of the store for verification purposes;
        a receiver configured to receive a request for a payment authorization message from a sales terminal in the store, said payment authorization message comprising a price for the selected item;
        a processor operatively coupled with the memory and configured to:
            process the request for the payment authorization message received from the sales terminal;
            generate a price authorization message for transmission to the sales terminal wherein the price authorization message comprises:
                the price of the selected item;
                the card number reflecting the form of the payment;
                an e-signature of the user; and
                an interjacence countermeasure that ensures the user that the price authorization message is free from interjacence;

transmit the price authorization message to the sales terminal;
an antenna for transmission of signals to the store terminal;
an input/output subsystem operatively coupled with the memory and the processor, said input/output subsystem comprising:
a display driver; and
a display, having several modes selectable by using a scrolling wheel, configured to:
present the price to the user; and
enable acceptance by the user of the price responsive to the entry of the personal identification code for the user;
at least one encryption engine that protects communication between the device and the sales terminal; and
the scrolling wheel configured to control the display.

* * * * *